Patented May 28, 1929.

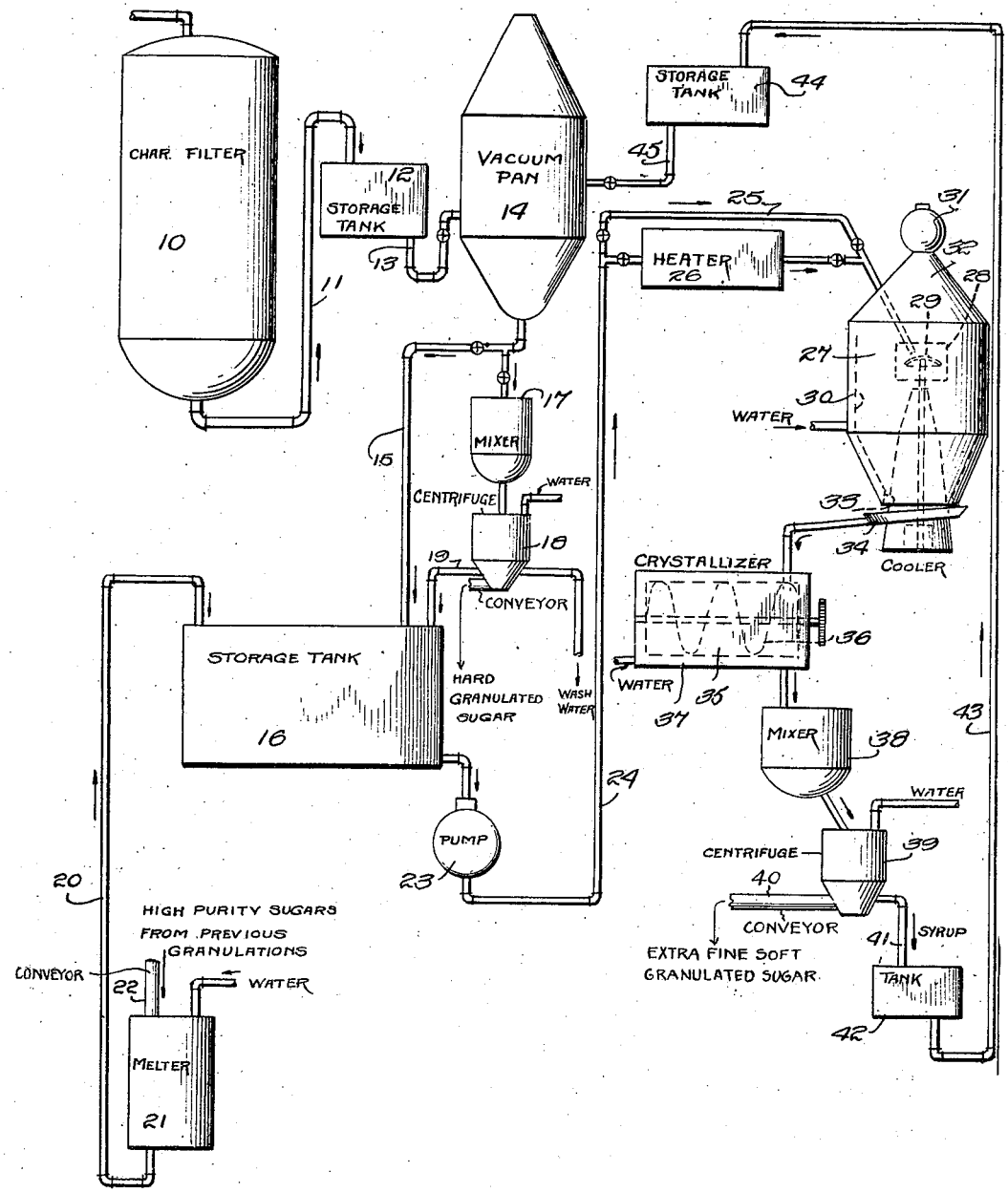

1,715,049

UNITED STATES PATENT OFFICE.

BERNARD H. VARNAU AND TRUMAN B. WAYNE, OF SUGAR LAND, TEXAS.

PROCESS FOR MANUFACTURE OF EXTRA FINE SOFT GRANULATED SUGAR.

Application filed September 4, 1926. Serial No. 133,594.

This invention relates to the manufacture of extra fine soft granulated sucrose sugar from sucrose syrups and liquors of relatively high purity such as those usually found in cane sugar and beet sugar factories in connection with the manufacture of standard grades of white and yellow clarified sugars, or through remelting of commercial sugars into liquor of sufficient purity. It relates, more particularly, to the method of crystallization of the sucrose from the mother liquor in a crystalline state and substantially free from impurities.

The principal object of this invention is the production on a commercial scale and by methods which are economically feasible, of an extra fine crystalline sucrose sugar of a texture resembling the ordinary commerical "soft" sugars, but of a purity much higher than the latter and resembling in color and purity the high grade refined cane and beet sugars of commerce. The method may also be used in the production of a high grade soft sugar of from 98 to 99 per cent purity (98 to 99 per cent sucrose calculated on the basis of dry substance) from syrups and liquors which are not of sufficient purity for the production of the very highest grade of white sugars.

In the accompanying drawing we have shown in diagrammatic form our preferred system for carrying out our process.

In this showing, reference numeral 10 indicates a conventional refinery char filter which is connected by a suitable pipe 11 to a storage tank 12 for holding the high purity liquors obtained from the char filter 10. The storage tank 12 is connected by a suitable pipe 13 to a vacuum pan 14. The vacuum pan may be connected by a pipe 15 to the principal storage tank 16 or may be connected by a by-pass through the mixer 17, the centrifugal machine 18 and the pipe 19 to the principal storage tank 16. Also connected to the storage tank 16 by means of a pipe 20 is a melter 21 which is adapted to receive high purity sugars from previous granulations through the conveyor 22. Connected to the principal storage tank 16 is the pump 23 which is adapted to pump the liquor from the tank 16 through the pipe 24 and pipe 25, or by a by-pass through the heater 26 to the cooler 27.

The cooling apparatus 27 is preferably composed of a motor driven centrifugal basket 28 which is provided with a scatter plate 29 and is surrounded by a water jacket 30 through which the cooling water is adapted to circulate. A current of air is drawn through the cooling chamber from below by means of a fan 31 located at the top of the hood 32. The lower portion of the cooler is provided with openings 33 adapted to discharge the cooled liquor into the trough 34 which is connected to the crystallizer 35. The crystallizer 35 is provided with suitable agitating means 36 and is surrounded by a water jacket 37. The interior of the crystallizer 35 is connected to a mixer 38 and a centrifugal machine 39. A conveyor 40 is suitably connected to the centrifugal machine 39 and is adapted to carry off the soft granulated sugar to the finishing department. To the centrifugal machine 39 is connected a pipe 41 adapted to conduct the syrup from the centrifugal machine to a suitable tank 42 from which the syrup may be conducted by means of the pipe 43 to a storage tank 44 which is adapted to be connected by means of the pipe 45 to the vacuum pan 14. While the above described apparatus is particularly adapted for the manufacture of extra fine soft granulated sucrose sugar of high purity, it may also be used in the production of high grade soft sugars of a quality somewhat inferior to the highest grade white sugars.

It has long been customary to make crystalline sugars of various degrees of purity by boiling liquors and syrups in vacuum pans to obtain "grain" of proper characteristics. The process is essentially the same for all grades of sugars, although modifications in the method of handling the contents of the vacuum pans are necessary in boiling liquors and syrups of different purities, and when sugars of different grain characteristics are required. The operation of the vacuum pans is controlled by men skilled in the art of boiling sugar. In boiling liquors and syrups of high purity (90 to 99.9 per cent sucrose calculated on the basis of dry substance) it has not been the practice to boil to obtain "grain" of extremely fine and soft crystal characteristics because of certain difficulties which arise in the formation of crystals which will be uniform in size and subsequent difficulties in purging and washing of the crystals so formed. The usual granulated and yellow clarified sugars of commerce possess crystals of larger size and much harder texture. The soft sugars of commerce have very small, soft crystals, but are of lower purity than the usual granulated and yellow clarified sugars because these soft sugars are boiled from liquors and syrups of lower purity which readily admit of handling by the sugar boiler in a manner making their production feasible.

We have discovered that by making quite a radical departure from the usual commercial methods of producing high grade white sugars, a sugar of very close to 100 per cent purity can be produced having the very small crystals of soft texture characteristic of the soft sugars of commerce now being produced by boiling in vacuum pans, but of much higher purity than the latter. Sucrose, either from sugar cane or beet products, of nearly absolute purity has been made for many years in the form of the usual hard granulated crystals, but never, so far as we are aware on a commercial scale in the form of almost absolutely pure, soft, extra fine, crystals. Sucrose crystals having these characteristics have been produced on a laboratory scale, and on a very restricted commercial scale by separation from alcoholic solutions according to the usual methods of producing chemically pure sucrose for experimental purposes, but never from water solutions on a commercial scale for use as an every-day commodity.

The present process involves, in the first place, the crystallization of extremely fine or moderately fine sucrose crystals, depending on certain conditions which will be outlined later, from the mother liquor of relatively high purity and proper degree of supersaturation by rapidly cooling the supersaturated solutions to the point where experience indicates that enough fine crystals of the proper type have formed to prevent subsequent crops of crystals from forming, and at the same time allowing those crystals which have formed to feed from the mother liquor for a period of time sufficient for the production of a finished sugar of the desired crystal characteristics. For liquors of very high purity (97.5 to 99.9 per cent purity) this temperature drop need be only a few degrees below the saturation point because of the readiness and velocity of crystallization of sucrose from liquors of this type, but in general as the purity is lowered the degree of cooling must be greater. Furthermore, the type of sugar desired (as regards crystal characteristics and size) determines how rapidly and to what extent the temperature must be reduced below the saturation point of the liquor or syrup under treatment. Obviously, also, the density and temperature of the liquor or syrup to be treated determine to what degree these temperature reductions must be made, but, in general it may be said that the lighter the density (total solids content) the greater must be the temperature drop induced by rapidly cooling any liquor or syrup of a given temperature and purity, and at higher temperatures of the liquor or syrup greater temperature drops must be secured in order to get satisfactory crystal formation.

In general, liquors and syrups ranging from 75 to 85° Brix at 17.5° C., and of purities ranging from 80 to 99.9 per cent of suitable color may be used in the production of extra fine soft granulated sugars by the present process; the quality of the sugars so produced being determined by the purity of the original liquors and the amount of wash water used in the centrifugal machines. Liquors and syrups used in this manner may range in temperature anywhere between 140° and 212° F., there being no advantage from the standpoint of the present process in using higher temperatures, except where it is necessary to heat the solution in order to melt sucrose crystals which may be present and which may adversely affect the operations which follow.

The method of obtaining "grain", that is, the preliminary crystal formation, or setting, upon which the crystals of the finished sugar will be formed, is, in the present process, entirely different from that now employed in the usual processes for the manufacture of sucrose sugars. In the usual process of boiling to obtain "grain" in vacuum pans, the liquor or syrup is delivered to the pans and is therein concentrated under vacuum until a condition of supersaturation is reached. As supersaturation proceeds, minute crystals are formed which rapidly increase in number until the pan boiler, who is skilled in the art of boiling sugar, judges that enough "grain" has been formed. Then by skillfully manipulating the water valves controlling the water supply in the condenser, the operator decreases the vacuum sufficiently to permit the temperature of the contents of the pan to rise just enough to prevent the formation of more crystals, and from this point the small crystals are nourished by the mother liquor surrounding them until they have reached the desired size. During the growth of these crystals, the mother liquor must be kept sufficiently saturated to feed these crystals but yet must not reach the point of supersaturation so that new crystals will form. If the latter should occur the mass of crystals may not purge satisfactorily in the centrifugal machines. With liquors of high purity, owing to their property of readily crystallizing, the preliminary crop of crystals must be carefully acquired and handled thereafter, and since the temperature ranges between 135° and 165° F. at different stages of the boiling the crystals are formed and nourished at temperatures which tend to form hard crystals Therefore, as stated above, in the vacuum pan process of crystallizing sucrose sugars, the operator tries to conduct his evaporation to the condition of supersaturation under as high vacuum as it is feasible to use. Concentration is, therefore, rapid and the graining point is rapidly reached in order to obtain as uniform a grain setting as possible. However, even under the most favorable conditions by this process the grain setting is not acquired all at one time and there is necessarily some variation in the size of the crystals grow from them. If these crystals are allowed to grow sufficiently in order that the smallest crystals will not interfere with the purging of the massecuite thus boiled from liquors and syrups of high purity, the resulting sugar will be made up of hard crystals, the smallest which are produced on a commercial scale being considerably larger than the crystals which we have found it possible to manufacture by the present process. We have discovered that by rapidly cooling sucrose solutions of sufficiently high supersaturation and purity it is possible to produce, by means which are economically feasible, grain settings of extremly numerous crystals which are uniform enough to allow the production of extra fine sugars of high quality.

In the second place, the conditions under which crystallization is induced must be so regulated as regards temperature and density of the mother liquor that crystals of sufficiently uniform characteristics to allow ready purging from the mother liquor, will be formed. Sucrose readily separates from supersaturated solutions of high purity, and unless uniform grain settings are obtained (enough crystals must form to prevent the formation of subsequent crops of crystals) secondary crops of crystals may form and make it difficult or impossible to separate the crystals from the mother liquor by the ordinary centrifugal machine process employed in sugar factories for this purpose. Furthermore, we have found that the size of the crystals formed may be regulated by the initial density and temperature of the liquor or syrup, and the rapidity and degree of cooling, or a combination of these factors. In general, smaller crystals are produced by cooling liquors of higher density, or by a quicker and greater degree of cooling when density conditions are equal. Of course, it naturally follows that smaller crystals may also be produced by cooling solutions at higher temperatures down to the usual temperatures to which liquors of lower initial temperature are usually cooled. Conversely, larger crystals are produced by regulating the cooling process so that smaller temperature drops are obtained, thus obtaining a less dense setting of grain which have proportionately more mother liquor from which they may draw substance and grow to larger dimensions.

A novel feature of our process is that an almost complete grain setting (crystal setting) is obtained almost instantaneously when the supersaturated solution is cooled below the point where it can still hold its entire sucrose content in solution. If conditions of density and temperature are properly regulated, crystals of fairly definite characteristics as regards size and texture (texture as regards the "feel" of the crystals according to the usual commercial mode of expression) can be obtained. The crystals can then be allowed to grow while being slowly agitated in any of the usual forms of crystallizers, the process in this respect being similar to the crystallization of lower purity massecuites which have been boiled to grain in vacuum pans. Since the crystals are formed in relatively cool liquors and no heat is employed subsequently other than the residual temperature of the partially cooled mixture of crystals and mother liquor, the crystallization and growth of the crystals are obtained under conditions quite opposite from those under which high grade white sucrose sugars are manufactured. The sugar manufactured by the present process is composed of very fine crystals of relatively uniform size and soft texture, in direct contradistinction to the larger and very hard crystals of the commercial sucrose sugars of equivalent purity.

Our invention contemplates, as has been stated above, the relatively rapid cooling of the supersaturated sugar solution in order to obtain an even setting of grain (crystals) as a foundation upon which the larger crystals of the finished sugar may grow. If liquors in this state of supersaturation are allowed to cool slowly by running them into large tanks wherein cooling takes place gradually, crystallization will occur; but with liquors of relatively high purity crystallization is very likely to occur in several stages as cooling proceeds, with the result that the massecuite so formed will be composed of crystals of various sizes and shapes surrounded by mother liquor, and the process of separating the mother liquor will be hindered or rendered impossible by the formation of a dense film of small crystals in the centrifugal machine next to the lining. Therefore, to be successful on a commercial scale, the process must be capable of regulating the formation and growth of the crystals so that the crystals will purge freely in the centrifugal machines.

While satisfactory crystal formation can always be induced by the relatively rapid cooling of liquors and syrups of proper density (78 to 85° Brix at 17.5°) and purity (96 to 99.9 per cent), when dealing with liquors and syrups of the same density range but lower purity (80 to 96 per cent purity), the process of "seeding" may be employed in order to insure a proper grain (crystal) formation in case that satisfactory settings are not obtained by the rapid cooling below the saturation point of the sugar solution alone. This "seeding" may be done by introducing dry seed secured from a previous batch, but owing to the density of the liquors and syrups being treated it is preferable to use a small quantity (1 to 10 per cent by volume) of a magma from a previous batch which has in it crystals of satisfactory characteristics. This magma for seeding purposes is best introduced into the liquor or syrup just before the latter is pumped to the cooling vessel. The process of "seeding" may be used in obtaining proper crystal formation in liquors and syrups whose impurities tend to unfavorably influence crystallization of sucrose therefrom in the desired manner.

In the practice of our process we may employ a hot, supersaturated, sucrose liquor of syrup of relatively high purity (90 to 99.9 per cent purity and suitable color when extra high grade white sugar is desired, or from 80 to 95 per cent purity when slightly off grade white sugar or soft sugars are desired), produced, for example, by concentrating high purity liquors obtained from refinery char filters or from the use of vegetable decolorizing carbons, or from remelting sugars from previous crystallizations into liquors of from 75 to 85° Brix at 17.5° C. Other liquors which are particularly well adapted for use in the production of sugar by our process are the granulated syrups derived from the centrifugal machines when centrifuging the high grade hard granulated sugars ordinarily manufactured in cane sugar refineries. Since the latter, when collected separately from the wash water used in washing the sugar are at approximately 80° Brix at 17.5° C. (80 per cent solids) and range from 140° to 170° F., they fall within the most favorable limits of density and temperature for the production of sugar by our process.

In the usual operation of cane sugar refineries, these high purity wash syrups from strikes of granulated sugar are diluted and heated preparatory to being again taken into the white sugar pans and boiled into other strikes of hard granulated sugar, or may be sent to the char filters for further purification before being reboiled. We have found that these syrups can be used directly in the production of high grade white sugar without further concentration or boiling in vacuum pans and since our process fits in so well with the usual routine of manufacturing hard white granulated sugar in cane sugar refineries we have described and claimed this modification of the present process in our copending application, Serial No. 133,595, filed September 4, 1926.

In the preferred practice of our process the liquor or syrup to be made into sugar, produced by concentrating high purity liquors from refinery bone char or vegetable carbon decolorizing processes, or by melting sugars from previous crystallizations of sufficiently high purity, or from any other source capable of yielding satisfactory liquors by means which are commercially feasible is run through pipes 15, 19, or 20 to storage tank 16. This liquor will ordinarily have a density of from 80° to 82° Brix at 17.5° C. (but will be correspondingly lighter depending upon its temperature under actual operating conditions) and a temperature of approximately 160° F. A small centrifugal pump 23 having its suction attached to the storage tank then pumps the liquor or syrup through the pipe 24 into the heater 26 where the temperature is raised sufficiently to melt any crystals, or the major portion of them, which may already be present in the liquor or syrup. If the liquor or syrup is practically free from grain it may be by-passed through pipe 25 directly to the cooling apparatus 27. This cooler 27 must be of suitable design to allow rapid cooling of the syrup to the desired point where a satisfactory grain setting is obtained, and is preferably composed of a motor-driven centrifugal basket 28 which is provided with a scatter plate 29 upon which the hot liquid is projected by the force of the centrifugal pump. The liquor or syrup is finely atomized by the action of being thrown by the scatter plate against the sides of the basket, and from thence against a cooling jacket made of copper surrounded by a water jacket 30 for the purpose of circulating cooling water next to the cooling surface upon which the finely atomized liquor is projected. The rate of cooling is determined by the rate at which the liquor is pumped into the centrifugal basket 28 through the pipe 25 and the velocity and temperature of the cooling water circulated in the water jacket 30. A current of air is drawn through the cooling chamber from below by the fan 31 located at the top of the hood 32. The liquor is thrown out of the basket against the cooling surface, and then runs down the vertical sides of the apparatus and out of the openings 33 into the trough 34. While the inventors prefer this type of cooling apparatus because of the rapidity of the cooling action and the ease with which the temperature of the effluent liquor may be controlled, it is obvious that the same action may be obtained in other types of apparatus which may employ spray nozzles as a means of atomization of the liquor or syrup to be cooled, or through the use of cooling coils furnishing sufficient cooling area to obtain the desired results. However, we have found that spray nozzles have a tendency to become clogged by small crystals and suspended matter which may be present in the liquors and syrups undergoing cooling; and in using other types of cooling apparatus which do not effect the immediate cooling action obtainable with the apparatus described above, some difficulty is often experienced with some sucrose liquors and syrups due to the formation of irregular grain settings brought about by ununiform cooling. The cooled liquor which runs out of the cooling apparatus into the trough 34 should have the proper grain setting for the type of sugar which is to be manufactured, and is conducted to the crystallizer 35 which is provided with the agitator 36 to keep the mass in slow agitation until the crystals have grown to the desired size. Water, either warm or cold, may be circulated through the water jacket 37 in order to bring the crystallizing mass to the desired temperature. Ordinarily, this temperature should be maintained between 90° and 100° F. but after satisfactory crystal formation is assured, the operator may reduce the temperature as low as 80° F. or even lower. The condition of the material will determine how low the temperature may be reduced, the aim being to reduce the temperature as far below the saturation point as possible, in order to obtain a maximum yield and yet not adversely affect the character of the crystals.

The actual temperatures and densities employed, will necessarily depend upon the grade of sugar to be produced, and the character of the sucrose solution to be treated. Also, the temperature of the original liquor or syrup will determine the degree to which cooling must be carried in order to get satisfactory grain settings. The temperature of the original liquor or syrup may range between 140° and 212° F., or possibly either higher or lower. This is determined by the source of the liquor and the method of its preparation. If the liquor or syrup is obtained from evaporation of a less concentrated liquor under vacuum the lower temperatures will prevail, but if it is prepared by melting of sugar from previous crystallizations it will be necessary to carry higher temperatures in order to get a solution of the required density which is practically free from grain which may adversely affect the purging quality of the massecuite to be formed later. Liquors ranging between 75 and 85 per cent solids may be used although the most favorable density is about 80 to 82 per cent solids, and the method of cooling and handling will have to be altered to suit conditions, both in regard to density and purity of the liquor or syrup being treated.

The temperature drop which must be obtained in the cooling apparatus will likewise vary with the type of crystals, whether large or small, to be made, the density of the solution, and the purity thereof. In general, when small crystals are desired, the temperature drop will be greater in order to obtain a thick setting of grain which will later be developed to the desired size in the crystallizer; and when large grain is desired, the temperature drop will be less for the same solution in order to obtain a less dense setting of grain which may then grow to the desired size in the crystallizer. Likewise, when the solution is lighter than the most favorable density (80 to 82 per cent solids) greater temperature drops are necessary because the saturation point is lower for lighter solutions. With solutions of lower densities and lower purity, crystal formation is more difficult to control, and the process of "seeding" can be employed to advantage in order to introduce more of the solid phase and make it dominant over the other factors of temperature, density, and purity in determining the growth and character of the crystals. This we prefer to do by introducing a quantity of magma from a previous crystallization which possesses the proper crystal characteristics; the quantity ranging between 1 and 10 per cent depending upon what is found by experience to produce best results for the solution being treated, and this magma is best introduced into the hot solution and thoroughly mixed just before being pumped to the cooling apparatus 27.

Obviously, since the temperature drop and temperature of the cooled liquor or syrup are dependent upon the purity, density, and temperature of the original liquor or syrup, it is impossible to disclose exactly what temperature drops must be obtained in a general way for all solutions to be treated. The controlling factor is the grain setting to be obtained, and which any one skilled in the art of crystallizing sugar can determine by examination of the crystal formation when viewed on a glass over a light or other source of illumination. However, we will define, in a general way, these ranges by stating that with original liquors and syrups at 80 per cent solids and ranging between 140° and 212° F. temperature drops of from 12 to 80° F. must be obtained, and the effluent mass from the cooling apparatus 27 may range between 95° and 130° F. or possibly higher when the solution is seeded before cooling and large grained sugar is desired. With solutions of very high purity (97.5 to 99.9 per cent purity) the lower limit of temperature drops is desirable under certain conditions, although drops of from 20° to 50° F. are usually employed.

After the grain setting has been induced in the cooling apparatus 27, the crystallizing magma is further cooled in the crystallizer 35 and maintained at a temperature of approximately 95° F. although this temperature may be varied at the discretion of the operator, until a satisfactory crystal growth is assured, after which the magma may be further cooled to 80° F. or possibly lower, the idea being to get as great a temperature drop below saturation as possible in order to get a maximum yield, yet without detrimentally affecting the character of the grain. The magma is allowed to remain in the crystallizer from 30 minutes to 6 hours, or in some instances even longer provided adequate crystallizer capacity is available and it is found that the increased yield makes this economically feasible. The high purity magmas remain in the crystallizer the shortest time, and the low purity magmas are kept in slow agitation for longer periods of time.

When the crystallizing operation is completed, the magma is run out by gravity, or pumped if necessary into the mixer 38 of the centrifugal machine 39. This mixer is of sufficient capacity to supply a number of machines which are installed and operated in the usual manner employed in centrifuging sugar. The syrup thrown off from the sugar passes out of the centrifugal machine through the pipe 41 and may be diluted and heated to melt fine grain, and then pumped back to storage tank 44 from which it may be sent to vacuum pans or multiple effects for concentration for use in extracting further sugar by retreatment by the present process, if its purity and density are satisfactory, or may be boiled into further strikes of sugar in the vacuum pans. As the present process is not applicable or intended for use in the extraction of sugar from low purity syrups, it is best used in conjunction with the vacuum pan process of boiling sugar, the latter being used after the purity and other characteristics of the syrups are not favorable for the production of sugar by the present process.

We have outlined in considerable detail the general principles governing the improved process for the manufacture of sucrose sugars by a novel means of obtaining crystallization from high purity sucrose solutions. In solutions of this character, sucrose is readily crystallizable and has hitherto been crystallized by rapid concentration in vacuum pans until a condition of supersaturation has been reached where crystals will separate in the desired number and form. We have found that by subjecting supersaturated sucrose solutions of equivalent purity to sudden temperature drops, crystallization can be induced and controlled so satisfactorily that sugars of relatively finer and softer texture may be manufactured by methods which are economically feasible, and which, in general overcome the objectionable features now attending any attempts to manufacture such sugars by the usual methods of boiling to grain in vacuum pans. Methods resembling the one which we propose have been used in the crystallization of dextrose and other difficultly crystallizable sugars of different chemical composition and properties, and which carry such large supersaturations in water solutions. However, with sucrose solutions of high purity which will not carry such high supersaturations, crystallization has been always induced by simply increasing the supersaturation by concentration under partial vacuum at temperatures ranging between 135° and 170° F., but we have discovered that crystallization may be very successfully induced by a temperature drop below saturation. We have stated densities, purities, and proportions within the limits which we have found practical and feasible from the standpoint of high quality in the product and economy in manufacture, but the best results can be obtained only by variations in the method which may be found necessary when meeting any given set of conditions. These disclosures of the principles and preferred practice of our invention will enable the skilled worker in the art to operate the method successfully, and any variations necessary will be within the power of said skilled worker.

In regard to re-treatment of mother liquors from the first crystallization, this can be done by diluting and heating them in a small tank as they are discharged from pipe 41 pumping back to storage tank 44 and then re-concentrating to 80–82 per cent solids in vacuum pans. The concentrated liquor so obtained may then be subjected to the treatment described above in order to obtain a second drop of crystals, which, if not of sufficient purity for use as first sugars, may be remelted and the resulting liquor mixed in with a fresh batch of liquor and allowed to undergo treatment as described above. If the grade of sugar which we manufacture by the present process is manufactured in conjunction with sugars of the ordinary commercial types it will be found convenient to omit successive re-treatments, and after diluting and heating the mother liquors they are supplied to vacuum pans for further sucrose extraction by the usual methods of boiling to grain in partial vacuums.

In referring to crystal characteristics, we have used the word "type" and "normal" which refer to crystal characteristics of uniformity and size desirable for the sugar required.

In the practice of our process, while we prefer the rapid cooling effect of spraying the hot supersaturated sugar solution through an air chamber either with or without the aid of a cooling surface, it is to be understood that rapid cooling to a degree necessary for the successful production of the desired type of sugar from the liquor or syrup in process by any other means or modification of the above method and apparatus may be employed without departure from the spirit of the invention. The degree of modification will vary according to the varying characteristics of the supersaturated liquor or syrup to be treated.

While we have described the preferred practice of our process and form of apparatus by which it may be carried out, it is to be understood that the details of procedure of the process and the form of apparatus described may be widely varied without departing from the spirit of the invention or the scope of the subjoined claims.

We claim:

1. The process of crystallizing sucrose from liquors and syrups of high purity which comprises maintaining a relatively concentrated sucrose solution substantially free from crystals at a temperature of approximately from 140° to 212° F., rapidly cooling said solution to effect a substantially complete and regular grain setting, maintaining said solution at a crystallizing temperature and separating the crystals formed from the mother liquor.

2. The process of crystallizing sucrose from liquors and syrups of high purity which comprises maintaining a relatively concentrated sucrose solution substantially free from crystals at a temperature of approximately from 140° to 212° F., rapidly cooling said solution to approximately from 95° to 130° F. to effect a substantially complete and regular grain setting, maintaining said solution at a crystallizing temperature and separating the crystals formed from the mother liquor.

3. The process of crystallizing sucrose from liquors and syrups of high purity which comprises maintaining a sucrose solution at a temperature of approximately from 140° to 212° F., to concentrate the same to a density of approximately from 75° to 85° Brix at 17.5° C., rapidly cooling said solution to effect a substantially complete and regular grain setting, maintaining said solution at a crystallizing temperature, and separating the crystals formed from the mother liquor.

4. The process of crystallizing sucrose from liquors and syrups of high purity which comprises maintaining a sucrose solution at a temperature of approximately from 140° to 212° F., to concentrate the same to a density of approximately from 80° to 82° Brix at 17.5° C., rapidly cooling said solution to effect a substantially complete and regular grain setting, maintaining said solution at a crystallizing temperature, and separating the crystals formed from the mother liquor.

5. The process of crystallizing sucrose from liquors and syrups of high purity which comprises maintaining a sucrose solution at a temperature of approximately from 140° to 212° F., to concentrate the same to a density of approximately from 75° to 85° Brix at 17.5° C., rapidly cooling said solution to approximately from 95° to 130° F., to effect a substantially complete and regular grain setting, maintaining said solution at a crystallizing temperature, and separating the crystals formed from the mother liquor.

6. The process of crystallizing sucrose from liquors and syrups of high purity which comprises maintaining the sucrose solution of relatively high density at a temperature of approximately from 140° to 212° F., rapidly cooling said solution to effect a substantially complete and regular grain setting, maintaining said solution at a crystallizing temperature for from one-half to six hours, and separating the crystals formed from the mother liquor.

7. The process of crystallizing sucrose from liquors and syrups of high purity which comprises heating a sucrose solution, maintaining the heat of said solution at a temperature of from 140° to 212° F. to concentrate the same to a relatively high density, rapidly cooling said solution to a temperature of from 95 to 130° F. to induce crystallization, maintaining the temperature of said solution at from 90 to 100° F. for from one-half to six hours, and separating the crystals formed from the mother liquor.

8. The process of crystallizing sucrose from liquors and syrups of high purity which comprises concentrating a mother liquor of sucrose, diluting said solution, heating said solution to dissolve any fine crystals present, reconcentrating said solution by heating to a temperature of from 140° to 212° F., rapidly cooling said solution to effect a substantially complete and regular grain setting, maintaining said solution at a crystallizing temperature, and centrifuging said solution to separate the crystals formed from the mother liquor.

9. The process of crystallizing sucrose from liquors and syrups of high purity to produce an extra fine, soft, crystalline sucrose sugar of substantially absolute purity which comprises heating a sucrose solution to from 140 to 212° F., maintaining such temperature to concentrate said solution to a relatively high density, rapidly cooling said solution to induce crystallization, maintaining said solution at a crystallizing temperature, and separating the crystals formed from the mother liquor.

10. The process of crystallizing sucrose from liquors and syrups of high purity to produce an extra fine, soft, crystalline sucrose sugar of substantially absolute purity which comprises heating a sucrose solution to from 140 to 212° F., maintaining such temperature to concentrate said solution to a relatively high density, rapidly cooling said solution to from 95 to 130° F., maintaining said solution at a temperature of from 90 to 100° F., for from one-half to six hours, slowly agitating said solution, reducing the temperature of said solution to 80° F. or below and centrifuging said solution to remove the crystals formed from the mother liquor.

11. The process of crystallizing sucrose from liquors and syrups of high purity which comprises cooling a hot sucrose solution of relatively high density sufficiently rapidly and through a sufficiently long temperature drop to effect a substantially instantaneous, complete and regular grain setting, maintaining said solution at a crystallizing temperature, and separating the crystals formed from the mother liquor.

12. The process of crystallizing sucrose from liquors and syrups of high purity which comprises cooling a hot sucrose solution of relatively high density and substantially free from crystals, sufficiently rapidly and through a sufficiently long temperature drop to effect a substantially instantaneous, complete and regular grain setting, maintaining said solution at a crstallizing temperature, and separating the crystals formed from the mother liquor.

13. The process of crystallizing sucrose from liquors and syrups of high purity which comprises cooling a hot sucrose solution having a density of from 75° to 85° Brix at 17.5° C., sufficiently rapidly and through a sufficiently long temperature drop to effect a substantially instantaneous, complete and regular grain setting, maintaining said solution at a crystallizing temperature, and separating the crystals formed from the mother liquor.

14. The process of crystallizing sucrose from liquors and syrups of high purity which comprises cooling a hot sucrose solution having a density of approximately from 80° to 82° Brix at 17.5° C., sufficiently rapidly and through a sufficiently long temperature drop to effect a substantially instantaneous, complete and regular grain setting, maintaining said solution at a crystallizing temperature, and separating the crystals formed from the mother liquor.

15. The process of obtaining an extra fine, soft, crystalline sucrose sugar of substantially absolute purity which comprises seeding a hot supersaturated sucrose solution having a density of from 75° to 85° Brix with a crystal-containing magma in the proportions of from 1 to 10 per cent by volume, cooling said solution sufficiently rapidly and through a sufficiently long temperature drop to effect a substantially instantaneous, complete, and regular grain setting, maintaining said solution at a crystallizing temperature, and separating the crystals formed from the mother liquor.

In testimony whereof we affix our signatures.

BERNARD H. VARNAU.
TRUMAN B. WAYNE.